United States Patent
Kotra et al.

(10) Patent No.: US 12,147,338 B2
(45) Date of Patent: Nov. 19, 2024

(54) LEVERAGING PROCESSING IN MEMORY REGISTERS AS VICTIM BUFFERS

(71) Applicant: Advanced Micro Devices, Inc., Santa Clara, CA (US)

(72) Inventors: Jagadish B Kotra, Austin, TX (US); Dong Kai Wang, Urbana, IL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/146,509

(22) Filed: Dec. 27, 2022

(65) Prior Publication Data

US 2024/0211393 A1    Jun. 27, 2024

(51) Int. Cl.
G06F 12/02      (2006.01)
G06F 12/0802    (2016.01)

(52) U.S. Cl.
CPC ...... *G06F 12/0292* (2013.01); *G06F 12/0802* (2013.01)

(58) Field of Classification Search
None
See application file for complete search history.

(56) References Cited

U.S. PATENT DOCUMENTS

| | | |
|---|---|---|
| 6,553,465 B1 | 4/2003 | Takusagawa |
| 6,944,746 B2 | 9/2005 | So |
| 7,047,393 B2 | 5/2006 | Paver |
| 8,359,462 B1 | 1/2013 | Khan et al. |
| 9,442,854 B2 | 9/2016 | Hyde et al. |
| 9,575,815 B1 | 2/2017 | Guthrie et al. |
| 10,061,588 B2 | 8/2018 | Gschwind et al. |
| 11,594,274 B2 | 2/2023 | Murphy et al. |
| 11,625,249 B2 | 4/2023 | Kotra et al. |
| 11,625,251 B1 * | 4/2023 | Agrawal ............ G06F 12/0815 712/7 |
| 11,663,008 B2 | 5/2023 | Lee et al. |
| 11,868,777 B2 | 1/2024 | Kalamatianos et al. |
| 11,921,626 B2 * | 3/2024 | Yoon .................. G06F 9/30101 |
| 12,073,251 B2 | 8/2024 | Challapalle et al. |
| 2008/0046692 A1 | 2/2008 | Michalak et al. |
| 2008/0244185 A1 | 10/2008 | O'Krafka et al. |
| 2011/0167222 A1 | 7/2011 | Lee et al. |
| 2011/0242113 A1 | 10/2011 | Keall et al. |
| 2013/0086367 A1 | 4/2013 | Gschwind et al. |
| 2014/0281405 A1 | 9/2014 | Streett et al. |

(Continued)

OTHER PUBLICATIONS

U.S. Appl. No. 17/136,767, "Non-Final Office Action", U.S. Appl. No. 17/136,767, filed Dec. 20, 2023, 20 pages.

(Continued)

*Primary Examiner* — Kevin Verbrugge
(74) *Attorney, Agent, or Firm* — FIG. 1 Patents (57) ABSTRACT

In accordance with the described techniques for leveraging processing in memory registers as victim buffers, a computing device includes a memory, a processing in memory component having registers for data storage, and a memory controller having a victim address table that includes at least one address of a row of the memory that is stored in the registers. The memory controller receives a request to access the row of the memory and accesses data of the row from the registers based on the address of the row being included in the victim address table.

20 Claims, 6 Drawing Sheets

(56) References Cited

U.S. PATENT DOCUMENTS

| | | | |
|---|---|---|---|
| 2016/0092238 | A1 | 3/2016 | Codrescu et al. |
| 2016/0155491 | A1 | 6/2016 | Roberts et al. |
| 2017/0060588 | A1 | 3/2017 | Choi |
| 2017/0123987 | A1 | 5/2017 | Cheng et al. |
| 2017/0213312 | A1 | 7/2017 | Woo et al. |
| 2017/0262369 | A1 | 9/2017 | Murphy |
| 2017/0344480 | A1 | 11/2017 | Beard et al. |
| 2018/0089081 | A1 | 3/2018 | Ramalingam |
| 2018/0188961 | A1 | 7/2018 | Venkatesh et al. |
| 2018/0336035 | A1 | 11/2018 | Choi et al. |
| 2020/0192757 | A1 | 6/2020 | Qin et al. |
| 2020/0218540 | A1 | 7/2020 | Kesiraju et al. |
| 2021/0271680 | A1 | 9/2021 | Lee et al. |
| 2022/0076717 | A1 | 3/2022 | Mathew et al. |
| 2022/0188117 | A1 | 6/2022 | Kalamatianos et al. |
| 2022/0188233 | A1 | 6/2022 | Kalamatianos et al. |
| 2022/0206817 | A1 | 6/2022 | Kotra et al. |
| 2022/0206855 | A1 | 6/2022 | Challapalle et al. |
| 2023/0028952 | A1* | 1/2023 | Kim ..................... G06F 3/0673 |
| 2023/0154522 | A1* | 5/2023 | Kim ................. G11C 11/40603 365/222 |
| 2023/0244442 | A1 | 8/2023 | Lee et al. |
| 2023/0244492 | A1 | 8/2023 | Kotra et al. |
| 2024/0004653 | A1 | 1/2024 | Alsop et al. |
| 2024/0126552 | A1 | 4/2024 | Kalamatianos et al. |

OTHER PUBLICATIONS

U.S. Appl. No. 17/853,613, "Final Office Action", U.S. Appl. No. 17/853,613, filed Dec. 22, 2023, 5 pages.

U.S. Appl. No. 17/853,613, "Non-Final Office Action", U.S. Appl. No. 17/853,613, filed May 16, 2023, 8 pages.

Ahn, Junwhan, et al., "PIM-enabled instructions: a low-overhead, locality-aware processing-in-memory architecture", ACM SIGARCH Computer Architecture News, vol. 43, No. 3S [retrieved Jan. 12, 2024]. Retrieved from the Internet <https://doi.org/10.1145/2872887.2750385>, Jun. 13, 2015, 13 pages.

Byoung-Hak, Kim, et al., "Exploration of a PIM Design Configuration for Energy-Efficient Task Offloading", 2019 IEEE International Symposium on Circuits and Systems (ISCAS) [retrieved Jan. 12, 2024]. Retrieved from the Internet <https://doi.org/10.1109/ISCAS.2019.8702339>, May 2019, 4 pages.

Ghose, S, et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> Aug. 8, 2019, 19 pages.

Giannoula, Christina, et al., "SynCron: Efficient Synchronization Support for Near-Data-Processing Architectures", Cornell University, arXiv Preprint, arxiv.org [retrieved Jan. 12, 2024]. Retrieved from the Internet <https://arxiv.org/pdf/2101.07557.pdf> Jan. 19, 2021, 14 pages.

Lee, Won Jun, et al., "Design of Processing—"Inside"—Memory Optimized for DRAM Behaviors", IEEE Access, vol. 7 [retrieved Jan. 12, 2024]. Retrieved from the Internet <https://doi.org/10.1109/ACCESS.2019.2924240>, Jun. 21, 2019, 16 pages.

Pattnaik, Ashutosh, et al., "Scheduling techniques for GPU architectures with processing-in-memory capabilities", PACT '16: Proceedings of the 2016 International Conference on Parallel Architectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.

"Google Project Zero", GitHub Inc., Uploaded by Projects by Google Project Zero [retrieved Sep. 15, 2022]. Retrieved from the Internet <https://github.com/googleprojectzero>., 3 Pages.

"HPCA 2021", The 27th IEEE International Symposium on High-Performance Computer Architecture (HPCA-27), Seoul, South Korea [retrieved Sep. 15, 2022]. Retrieved from the Internet <https://hpca-conf.org/2021/keynotes/>., Mar. 2021, 3 Pages.

U.S. Appl. No. 17/123,270, "Final Office Action", U.S. Appl. No. 17/123,270, filed Nov. 23, 2021, 15 pages.

U.S. Appl. No. 17/123,270, "Notice of Allowance", U.S. Appl. No. 17/123,270, filed Nov. 10, 2022, 7 pages.

U.S. Appl. No. 17/137,140, "Final Office Action", U.S. Appl. No. 17/137,140, filed Aug. 15, 2022, 8 pages.

U.S. Appl. No. 17/137,140, "Non-Final Office Action", U.S. Appl. No. 17/137,140, filed Mar. 9, 2022, 8 pages.

U.S. Appl. No. 17/137,140, "Notice of Allowance", U.S. Appl. No. 17/137,140, filed Dec. 8, 2022, 8 pages.

Alsop, Jonathan, et al., "US Application as Filed", U.S. Appl. No. 17/853,613, filed Jun. 29, 2022, 28 pages.

Aweke, Zelalem Birhanu, et al., "ANVIL: Software-Based Protection Against Next-Generation Rowhammer Attacks", ACM SIGPLAN Notices, vol. 51, No. 4 [retrieved Sep. 15, 2022]. Retrieved from the Internet <http://www.seclab.cs.stonybrook.edu/seclab/pubs/ANVIL.pdf>., Mar. 25, 2016, 13 Pages.

Brasser, Ferdinand, et al., "CAn't touch this: software-only mitigation against rowhammer attacks targeting kernel memory", Proceedings of the 26th USENIX Conference on Security Symposium [retrieved Sep. 15, 2022]. Retrieved from the Internet <https://www.usenix.org/system/files/conference/usenixsecurity17/sec17-brasser.pdf>., Aug. 16, 2017, 15 Pages.

Gulur, Nagendra Dwarakanath, et al., "Multiple sub-row buffers in DRAM: unlocking performance and energy improvement opportunities", Proceedings of the 26th ACM international conference on Supercomputing [retrieved Sep. 15, 2022]. Retrieved from the Internet <https://csrl.cse.unt.edu/sites/default/files/publications/p257-gulur.pdf>., Jun. 25, 2012, 10 Pages.

Hassan, Hasan, et al., "Uncovering In-DRAM RowHammer Protection Mechanisms:A New Methodology, Custom RowHammer Patterns, and Implications", 54th Annual IEEE/ACM International Symposium on Microarchitecture [retrieved Sep. 15, 2022]. Retrieved from the Internet <https://arxiv.org/pdf/2110.10603.pdf>., Oct. 17, 2021, 16 Pages.

Jin, Xingyu, et al., "Project Zero", News and updates from the Project Zero team at Google [retrieved Sep. 15, 2022]. Retrieved from the Internet <https://googleprojectzero.blogspot.com/>., Aug. 10, 2022, 15 Pages.

Kim, Yoongu, et al., "A case for exploiting subarray-level parallelism (SALP) in DRAM", 2012 39th Annual International Symposium on Computer Architecture (ISCA) [retrieved Sep. 15, 2022]. Retrieved from the Internet <https://www.pdl.cmu.edu/PDL-FTP/NVM/ISCA39_SALP.pdf>., Sep. 2012, 12 Pages.

Kim, Yoongu, et al., "Flipping bits in memory without accessing them: an experimental study of DRAM disturbance errors", ACM SIGARCH Computer Architecture News, vol. 42, No. 3 [retrieved Sep. 15, 2022]. Retrieved from the Internet <https://people.cs.pitt.edu/~znati/Courses/cs2001/2001pprs/row-hammering.pdf>., Jun. 14, 2014, 12 Pages.

Kim, Jeremie S, et al., "Revisiting RowHammer: An Experimental Analysis of Modern DRAM Devices and Mitigation Techniques", Cornell University arXiv, arXiv.org [retrieved Sep. 15, 2022]. Retrieved from the Internet <https://arxiv.org/pdf/2005.13121.pdf>., May 29, 2020, 15 Pages.

Konoth, Radhesh Krishnan, "ZebRAM: Comprehensive and Compatible Software Protection Against Rowhammer Attacks", 13th USENIX Symposium on Operating Systems Design and Implementation [retrieved Sep. 15, 2022]. Retrieved from the Internet <https://www.usenix.net/system/files/osdi18-konoth.pdf>., Oct. 2018, 15 Pages.

Lee, Chulki, et al., "Test DRAM for bit flips caused by the rowhammer problem", GitHub, Inc. Uploaded by rowhammer-test [retrieved Sep. 15, 2022]. Retrieved from the Internet <https://github.com/google/rowhammer-test>., 3 Pages.

Lee, Eojin, et al., "TWiCe: preventing row-hammering by exploiting time window counters", Proceedings of the 46th International Symposium on Computer Architecture [retrieved Sep. 15, 2022]. Retrieved from the Internet <https://cpb-us-w2.wpmucdn.com/sites.coecis.cornell.edu/dist/7/89/files/2019/06/isca19-334.pdf>., Jun. 22, 2019, 12 Pages.

Orosa, Lois, et al., "A Deeper Look into RowHammer's Sensitivities: Experimental Analysis of Real DRAM Chips and Implications on Future Attacks and Defenses", Cornell University arXiv, arXiv.

(56) References Cited

OTHER PUBLICATIONS org [retrieved Sep. 15, 2022]. Retrieved from the Internet <https://arxiv.org/pdf/2110.10291.pdf>., Oct. 19, 2021, 17 Pages.

Qureshi, Moinuddin, et al., "Hydra: enabling low-overhead mitigation of row-hammer at ultra-low thresholds via hybrid tracking", Proceedings of the 49th Annual International Symposium on Computer Architecture [retrieved Sep. 15, 2022]. Retrieved from the Internet <https://memlab.ece.gatech.edu/papers/ISCA_2022_1.pdf>., Jun. 11, 2022, 12 Pages.

Saileshwar, Gururaj, "Randomized row-swap: mitigating Row Hammer by breaking spatial correlation between aggressor and victim rows", Proceedings of the 27th ACM International Conference on Architectural Support for Programming Languages and Operating Systems [retrieved Sep. 15, 2022]. Retrieved from the Internet <https://gururaj-s.github.io/assets/pdf/ASPLOS22_Saileshwar.pdf>., Feb. 28, 2022, 14 Pages.

Yağlikçi, Giray A., et al., "BlockHammer: Preventing RowHammer at Low Cost by Blacklisting Rapidly-Accessed DRAM Rows", Cornell University arXiv, arXiv.org [retrieved Sep. 15, 2022]. Retrieved from the Internet <https://arxiv.org/pdf/2102.05981.pdf>., Feb. 11, 2021, 15 Pages.

U.S. Appl. No. 17/136,767, "Notice of Allowance", U.S. Appl. No. 17/136,767, filed Apr. 30, 2024, 18 pages.

U.S. Appl. No. 17/473,242, "Non-Final Office Action", U.S. Appl. No. 17/473,242, filed Mar. 7, 2024, 16 pages.

U.S. Appl. No. 17/853,613, "Non-Final Office Action", U.S. Appl. No. 17/853,613, filed Apr. 25, 2024, 9 pages.

Nai, Lifeng, et al., "GraphPIM: Enabling Instruction-Level PIM Offloading in Graph Computing Frameworks", 2017 IEEE International Symposium on High Performance Computer Architecture (HPCA), Feb. 2017, 12 pages.

Xu, Sheng, et al., "TUPIM: A Transparent and Universal Processing-in-Memory Architecture for Unmodified Binaries", GLSVLSI '20: Proceedings of the 2020 on Great Lakes Symposium on VLSI, Sep. 2020, 6 pages.

U.S. Appl. No. 18/298,723, "Non-Final Office Action", U.S. Appl. No. 18/298,723, Jun. 20, 2024, 9 pages.

U.S. Appl. No. 18/393,657, "Notice of Allowance", U.S. Appl. No. 18/393,657, Jul. 31, 2024, 9 pages.

\* cited by examiner

LEVERAGING PROCESSING IN MEMORY REGISTERS AS VICTIM BUFFERS

BACKGROUND

Processing in memory (PIM) architectures move processing of memory-intensive computations to memory. This contrasts with standard computer architectures which move data back and forth between a memory and a remote processing unit. In terms of data communication pathways, remote processing units of conventional computer architectures are further away from memory than PIM components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data moved between the memory and the remote processing unit is large. Thus, PIM architectures enable increased computer performance while reducing data transfer latency as compared to conventional computer architectures that implement remote processing hardware.

DETAILED DESCRIPTION

Overview

A memory architecture includes a processing unit communicatively coupled to a memory module that includes a memory and a processing in memory (PIM) component. In one or more implementations, the memory includes a plurality of banks where data is stored. Further, the banks include memory arrays that are organized into rows and columns of a grid such that data is stored in individual cells of the grid. To access data of the memory, a particular row that maintains the desired data is opened, e.g., the particular row is loaded into a row buffer of a bank. In order to open the particular row, however, a previously opened row is closed, e.g., the data of the previously opened row is written back to a corresponding row in the memory. Therefore, in order to access a new row, a memory controller typically issues a precharge command to close a currently open row and an activate command to open the new row. However, if a row is already open when access to the row is requested (e.g., a row hit), then the memory controller avoids issuing a precharge command and an activate command.

Since there is a considerable amount of overhead for closing a row of the memory and opening a row of the memory, row management policies are implemented to improve row hit rate. These row management policies determine whether to automatically close a row or to leave a row open after it is accessed depending on memory access patterns. However, row management policies improve hit rate to a certain extent, due to the limited amount of accessible data that can be stored in the row buffer.

Additionally, various workloads are not suitable for PIM. While such workloads are serviced, PIM registers sit idle, e.g., without actively servicing PIM commands. Thus, to further improve row hit rate over standard row management policies, techniques are described herein that repurpose idle PIM registers as victim row buffers. To do so, a memory controller receives a first request to access a row of the memory. To service the first request, the memory controller issues a precharge command to close a different row that is currently open, an activate command to open the row, and commands that access the row from the row buffer. Additionally, the memory controller issues PIM-load commands to load the row into the registers of the PIM component. In response, the memory controller updates a victim address table to include a memory address of the row loaded into the PIM registers. Notably, the victim address table includes addresses of rows that are currently stored in the registers of the PIM component.

At a subsequent time when a different row is open in the row buffer, the memory controller receives a second request to access the row. The memory controller determines that the row is stored in the registers of the PIM component by identifying the address of the row in the victim address table. Based on this determination, the memory controller issues one or more commands to access the data of the row from the registers of the PIM component, rather than from the row buffer of the memory. By doing so, the memory controller avoids issuing a precharge command to close the currently open row and an activate command to open a new row, which would otherwise be issued by conventionally configured memory controllers implementing standard row management policies.

In contrast to conventional techniques which only enable rows to be accessed from the row buffer of memory, the described techniques enable rows of the memory to be accessed from the PIM registers and the row buffer. By doing so, the described techniques increase the number of rows that are accessible by the memory controller at any given time, thereby increasing row hit rate, improving memory access latency, and improving overall computer performance.

In some aspects, the techniques described herein relate to a computing device comprising a memory, a processing in memory component having registers for data storage, and a memory controller having a victim address table configured to include at least one address of a row of the memory that is stored in the registers, the memory controller configured to receive a request to access the row of the memory, and access data of the row from the registers based on the address of the row being included in the victim address table.

In some aspects, the techniques described herein relate to a computing device, wherein an additional row of the memory is open when the request is received, the additional row remaining open after the data of the row is accessed from the registers.

In some aspects, the techniques described herein relate to a computing device, wherein the memory controller is configured to receive a prior request to access the row of the memory before the data of the row is stored in the victim address table, and, responsive to the prior request being received, open the row of the memory, access the data of the row from the memory, load the data of the row into the registers, and update the victim address table to include the address of the row.

In some aspects, the techniques described herein relate to a computing device, wherein the memory controller is configured to load the data of the row into the registers and access the data of the row from the memory in parallel.

In some aspects, the techniques described herein relate to a computing device, wherein the memory controller is configured to load the data of the row into the registers after the data is accessed from the memory.

In some aspects, the techniques described herein relate to a computing device, wherein the data of the row that is loaded into the registers corresponds to a first portion of the data of the row, and the request is to access the first portion of the data of the row and a second portion of the data of the row.

In some aspects, the techniques described herein relate to a computing device, wherein the memory controller is configured to automatically close the row after the data of the row is accessed from the memory.

In some aspects, the techniques described herein relate to a computing device, wherein the memory controller is configured to, in response to the request being received, re-open the row of the memory and access the first portion of the data of the row from the registers in parallel.

In some aspects, the techniques described herein relate to a computing device, wherein the memory controller is configured to load the data of the row into the registers based on a non-processing in memory workload being serviced.

In some aspects, the techniques described herein relate to a computing device, wherein the memory controller is configured to load the data of the row into the registers based on an access frequency of the row exceeding a threshold frequency.

In some aspects, the techniques described herein relate to a computing device, wherein the memory controller is configured to load the data of the row into the registers based on the request being included in a pending request queue.

In some aspects, the techniques described herein relate to a computing device, wherein the memory controller is configured to update the victim address table to include an indication of a particular register into which the data of the row is loaded, the row being accessed from the particular register in response to the request being received.

In some aspects, the techniques described herein relate to a method, the method including receiving, by a memory controller, a request to access a row of a memory, and in response to receiving the request, opening, by the memory controller, the row of the memory, accessing, by the memory controller, data of the row from the memory, and loading, by the memory controller, the data of the row into registers of a processing in memory component, the method further including receiving, by the memory controller, a subsequent request to access the row of the memory, and in response receiving the subsequent request, accessing, by the memory controller, the data of the row from the registers.

In some aspects, the techniques described herein relate to a method, the method further including updating, by the memory controller, a victim address table to include an address of the row.

In some aspects, the techniques described herein relate to a method, wherein the data of the row is accessed from the registers based on the address of the row being included in the victim address table.

In some aspects, the techniques described herein relate to a method, the method further including automatically closing, by the memory controller, the row of the memory after the data of the row is accessed from the memory, the row remaining closed after the data of the row is accessed from the registers.

In some aspects, the techniques described herein relate to a method, wherein the accessing the data of the row from the memory and the loading the data of the row into the registers are performed in parallel.

In some aspects, the techniques described herein relate to a method, wherein the loading the data of the row into the registers is performed after the accessing the data of the row from the memory.

In some aspects, the techniques described herein relate to an apparatus comprising a memory, a processing in memory component having registers for data storage, a memory controller having a victim address table configured to include at least one address of a row of the memory that is stored in the registers, and a core to transmit requests to the memory controller, the requests causing the memory controller to, responsive to a first request to access a row of the memory, open the row, access data of the row from the memory, load the data of the row into the registers, and update the victim address table to include an address of the row, and responsive to a second request to access the row, access the data of the row from the registers based on the address of the row being included in the victim address table.

In some aspects, the techniques described herein relate to an apparatus, wherein the first request causes the memory controller to load the data of the row into the registers based on a non-processing in memory workload being serviced.

Figure 1:
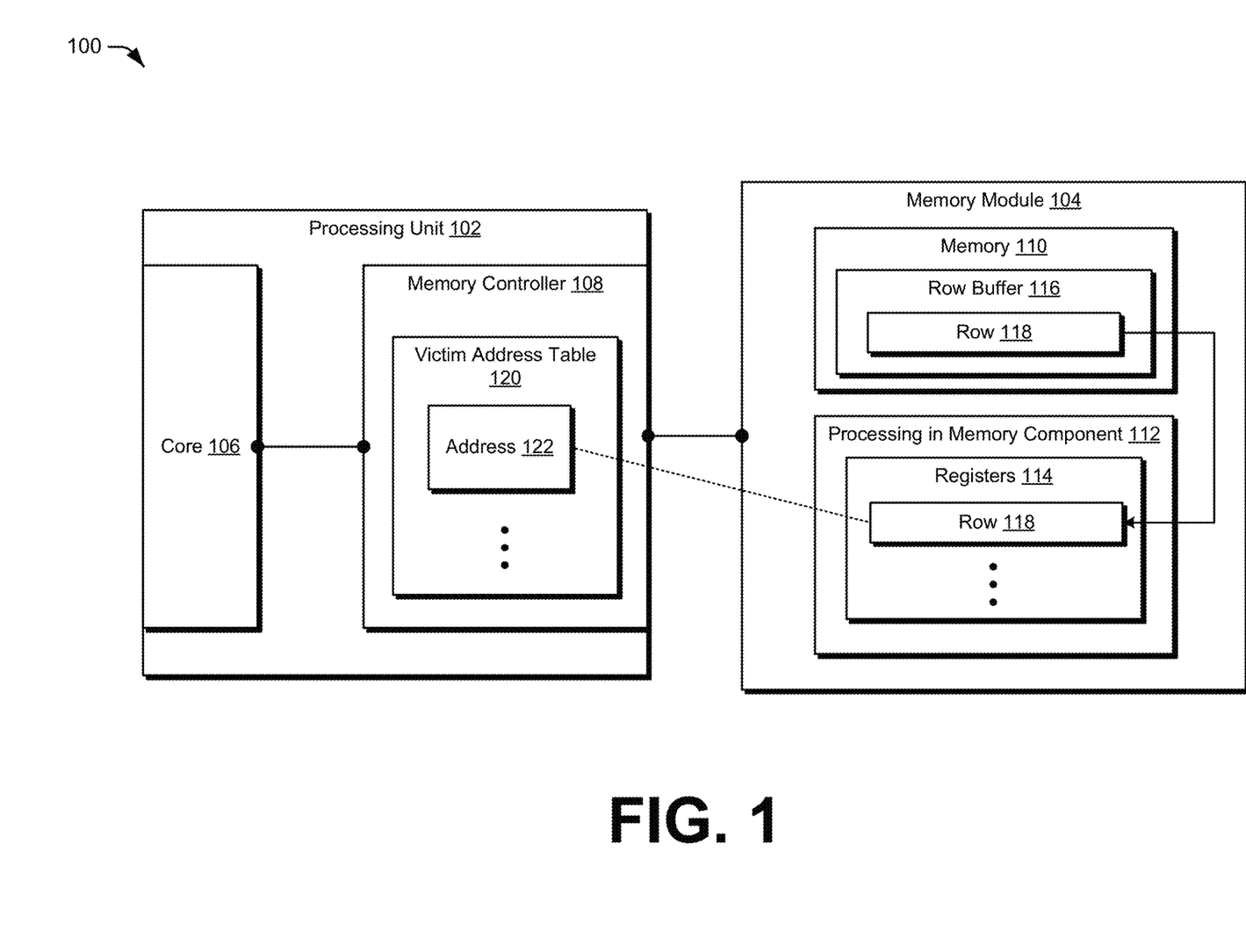
FIG. 1 is a block diagram of a non-limiting example system having a processing unit with a core and a memory controller coupled to a memory module having a memory and a processing in memory component.

FIG. 1 is a block diagram of a non-limiting example system 100 having a processing unit with a core and a memory controller coupled to a memory module having a memory and a processing in memory component. In particular, the system 100 includes a processing unit 102 and a memory module 104. The processing unit 102 includes a core 106 and a memory controller 108. The memory module 104 includes a memory 110 and a PIM component 112.

In accordance with the described techniques, the processing unit 102 and the memory module 104 are coupled to one another via a wired or wireless connection. The core 106 and the memory controller 108 are also coupled to one another via one or more wired or wireless connections. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The processing unit 102 is an electronic circuit that performs various operations on and/or using data in the memory 110. Examples of the processing unit 102 and/or the core 106 include, but are not limited to, a central processing unit (CPU), a graphics processing unit (GPU), a field programmable gate array (FPGA), an accelerated processing unit (APU), and a digital signal processor (DSP). For example, the core 106 is a processing unit that reads and executes commands (e.g., of a program), examples of which include to add data, to move data, and to branch. Although one core 106 is depicted in the example system 100, in variations, the processing unit 102 includes more than one core 106, e.g., the processing unit 102 is a multi-core processor.

In one or more implementations, the memory module 104 is a circuit board (e.g., a printed circuit board), on which the memory 110 is mounted and includes the PIM component 112. In variations, one or more integrated circuits of the memory 110 are mounted on the circuit board of the memory module 104, and the memory module 104 includes multiple PIM components 112. Examples of the memory module 104 include, but are not limited to, single in-line memory module (SIMM), dual in-line memory module (DIMM), high-bandwidth memory (HBM), and TransFlash memory module. In one or more implementations, the memory module 104 is a single integrated circuit device that incorporates the memory 110 and the PIM component 112 on a single chip. In some examples, the memory module 104 is composed of multiple chips that implement the memory 110 and the PIM component 112 that are vertically ("3D") stacked together, are placed side-by-side on an interposer or substrate, or are assembled via a combination of vertical stacking or side-by-side placement.

The memory 110 is a device or system that is used to store information, such as for immediate use in a device, e.g., by the core 106 of the processing unit 102 and/or by the PIM component 112. In one or more implementations, the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), and static random-access memory (SRAM). In some implementations, the memory 110 corresponds to or includes a cache memory of the core 106 and/or the processing unit 102 such as a level 1 cache, a level 2 cache, a level 3 cache, and so forth. For example, the memory 110 represents high bandwidth memory (HBM) in a 3D-stacked implementation. Alternatively or in addition, the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). Thus, the memory 110 is configurable in a variety of ways that support leveraging processing in memory registers as victim buffers without departing from the spirit or scope of the described techniques.

The memory controller 108 is a digital circuit that manages the flow of data to and from the memory 110. By way of example, the memory controller 108 includes logic to read and write to the memory 110. In one or more implementations, the memory controller 108 also includes logic to read and write to registers 114 of the PIM component 112, and to interface with the PIM component 112, e.g., to provide commands to the PIM component 112 for processing by the PIM component 112. In accordance with the described techniques, the registers 114 store data that is accessible by the PIM component 112, e.g., to execute one or more PIM commands. The memory controller 108 also interfaces with the core 106. For instance, the memory controller 108 receives commands from the core 106 which involve accessing the memory 110 and/or the PIM component 112 and provides data to the core 106, e.g., for processing by the core 106. In one or more implementations, the memory controller 108 is communicatively and/or topologically located between the core 106 and the memory module 104, and the memory controller 108 interfaces with the core 106 and the memory module 104.

Broadly, the PIM component 112 corresponds to or includes one or more in-memory processors, e.g., embedded within the memory module 104. The in-memory processors are implemented with example processing capabilities ranging from relatively simple (e.g., an adding machine) to relatively complex (e.g., a CPU/GPU compute core). The processing unit 102 is configured to offload memory bound computations to the one or more in-memory processors of the PIM component 112. To do so, the core 106 generates PIM commands and transmits the PIM commands, via the memory controller 108, to the memory module 104. The PIM component 112 receives the PIM commands and processes the PIM commands using the one or more in-memory processors and utilizing data stored in the memory 110. Example PIM commands include: (1) PIM-load commands which instruct the PIM component 112 to read data from a specified location in the memory 110 and store the data in the registers 114, (2) PIM-operate commands which instruct the PIM component 112 to perform specified operations on the data that is residing in the registers 114, and (3) PIM-store commands which instruct the PIM component 112 to write the data residing in the registers 114 to a specified location in the memory 110.

As mentioned above, the memory controller 108 is also configured to read and write directly to the registers 114 of the PIM component 112. To do so, the memory controller 108 receives PIM commands from the core 106, examples of which include: (4) PIM-read commands which instruct the memory controller 108 to read data directly from the registers 114 of the PIM component 112, and (5) PIM-write commands which instruct the memory controller 108 to write data (e.g., processed by the core 106) directly to the registers 114 of the PIM component 112.

Processing in memory using in-memory processors contrasts with standard computer architectures which obtain data from memory, communicate the data to the core 106 of the processing unit 102, and process the data using the core 106 rather than the PIM component 112. In various scenarios, the data produced by the core 106 as a result of processing the obtained data is written back to the memory 110, which involves communicating the produced data over the pathway from the core 106 to the memory 110. In terms of data communication pathways, the core 106 is further away from the memory 110 than the PIM component 112. As a result, these standard computer architectures suffer from increased data transfer latency, reduced data communication bandwidth, and increased data communication energy, particularly when the volume of data transferred between the memory and the processing unit 102 is large, which can also decrease overall computer performance. Thus, the PIM component 112 enables increased computer performance while reducing data transfer energy as compared to standard computer architectures which use the core 106 of the processing unit 102 to process data. Further, the PIM component 112 alleviates memory performance and energy bottlenecks by moving one or more memory-intensive computations closer to the memory 110. Although the PIM component 112 is illustrated as being disposed within the memory module 104, it is to be appreciated that in some examples, the described benefits of leveraging processing in memory registers as victim buffers are realizable through near-memory processing implementations in which the PIM component 112 is disposed in closer proximity to the memory 110 (e.g., in terms of data communication pathways and/or topology) than the core 106 of the processing unit 102.

In one or more implementations, the memory 110 includes a plurality of banks where data is stored. In particular, the banks are organized into one or more memory arrays (e.g., grids), which include rows and columns such that data is stored in individual cells of the memory arrays. To access data maintained in a memory 110 that is organized in this way, a particular row that maintains the desired data is opened. Broadly, "opening" a row of a bank causes data maintained in the row to be loaded into a row buffer 116 of the bank. The memory controller 108 is configured to schedule and issue an activate command to open a respective row of the memory 110. If a different row is currently open in the row buffer 116, however, the different row is closed before a new row can be opened. In general, "closing" a row clears the row buffer 116 and causes the data that is currently maintained in the row buffer 116 to be written back to a corresponding row of the bank. The memory controller 108 is configured to schedule and issue a precharge command to close a respective row of the memory 110.

Thus, in order to service a request to access data of a row, the memory controller 108 typically issues a precharge command to close a previously opened row as well as an activate command to open the row. The amount of time that it takes the memory 110 to service a precharge command is referred to as row precharge overhead. Similarly, the amount of time that it takes the memory 110 to service an activate command is referred to as a row activate overhead.

Once a row is opened, the data maintained in the open row can be accessed. For example, data can be read from the row buffer 116 to the registers 114 of the PIM component 112 (e.g., via one or more PIM-load commands) and data maintained in the registers 114 of the PIM component 112 can be written to the row buffer 116, e.g., via one or more PIM-store commands. Additionally or alternatively, data maintained in the row buffer 116 can be read by the memory controller 108 and transmitted to the core 106 for further processing (e.g., via one or more memory-read commands) and data processed by the core 106 can be transmitted to the memory controller 108 and written to the row buffer 116, e.g., via one or more memory-write commands.

The memory controller 108 implements different row management policies depending on workload to improve memory access latency. In example workloads with low row buffer locality and irregular row accesses, for instance, a close row policy is implemented to automatically close a row following some threshold time after the row is accessed, e.g., an auto-precharge. In this way, at least some of the row precharge overhead is eliminated when a different row is subsequently accessed. However, if the same row is subsequently accessed, unnecessary row precharge overhead and row activate overhead are incurred to close and re-open the row. In example workloads with high row buffer locality and regular row accesses, however, an open row policy is implemented to leave a row open in the row buffer 116 until a new row is subsequently accessed. In this way, row precharge overhead and row activate overhead are eliminated if the row that is requested to be accessed is already open in the row buffer 116, e.g., referred to as a "row hit." However, if the row that is requested to be accessed is not open in the row buffer 116 (e.g., a "row miss"), then the memory controller 108 incurs row precharge overhead and row activate overhead to close a previously opened row and open the row.

Notably, various workloads are not suitable for PIM, and while these workloads are serviced, PIM resources including PIM registers often sit idle, e.g., without actively servicing PIM commands. Thus, to improve hit rate and memory access latency, techniques are described herein to repurpose idle registers 114 of the PIM component 112 as victim row buffers. To do so, the memory controller 108 receives a first request from the core 106 to access the row 118 of the memory 110. To service the first request, the memory controller 108 issues a first set of commands, including: (1) a precharge command to close a previously opened row of the memory 110, (2) an activate command to open the row 118 of the memory 110, and (3) one or more commands that access the data of the row 118 from the memory 110. In contrast to conventional techniques, the memory controller 108 also issues (4) one or more PIM-load commands to load the data of the row 118 into the registers 114.

In response to issuing the PIM-load commands to load the data of the row 118 into the registers 114, the memory controller 108 updates a victim address table 120 to indicate that the data of the row 118 is stored in the registers 114 of the PIM component 112. Generally, the victim address table 120 is a data structure maintained by the memory controller 108 that includes addresses of rows in the memory 110 that are stored in the registers 114 of the PIM component 112. As shown, the memory controller 108 updates the victim address table 120 to include an address 122 which identifies the row 118 that was loaded into the registers 114.

In accordance with the described techniques, the memory controller 108 receives a second request to access the row 118 of the memory 110. In one or more implementations, the row 118 is no longer open in the row buffer 116 of memory 110 when the second request is received. Upon receiving the second request, the memory controller 108 determines that the address 122 for the requested row 118 is included in the victim address table 120, indicating that the data of the requested row 118 is stored in the registers 114.

Based on the address 122 of the row 118 being included in the victim address table 120, the memory controller 108 issues one or more commands to access the data of the row 118 from the registers 114 of the PIM component 112, rather than the row buffer 116 of the memory 110. By way of example, if the second request is a load request, the memory controller 108 reads the data of the row from the registers 114 using one or more PIM-read commands and transmits the data of the row 118 to the core for further processing. Additionally or alternatively, if the second request is a store request, the memory controller 108 receives the processed data from the core 106 and writes the processed data to the registers 114 using one or more PIM-write commands.

By accessing the data of the row 118 from the registers 114 of the PIM component 112, rather than the row buffer 116 of the memory 110, the memory controller 108 avoids issuing an activate command and a precharge command to access the data of the row 118, thereby eliminating row activate overhead and possibly row precharge overhead that would otherwise be incurred by conventional techniques. For example, a conventional close row policy would require the memory controller 108 to issue an activate command to open the row 118 in order for the row 118 to be accessed from the row buffer 116. Further, a conventional open row policy would require the memory controller 108 to issue a precharge command to close a previously opened row and an activate command to open the row 118 in order for the row 118 to be accessed from the row buffer 116.

In other words, the described techniques enable rows of the memory 110 to be accessed from both the row buffer 116 of the memory 110 and the registers 114 of the PIM component 112. This contrasts with conventional techniques which only enable rows of the memory 110 to be accessed from the row buffer 116. Thus, the described techniques increase the number of rows that are accessible at any given time by the memory controller 108. By doing so, the described techniques increase row hit rate, and in turn, improve memory access latency, which also improves overall computer performance.

Figure 2:
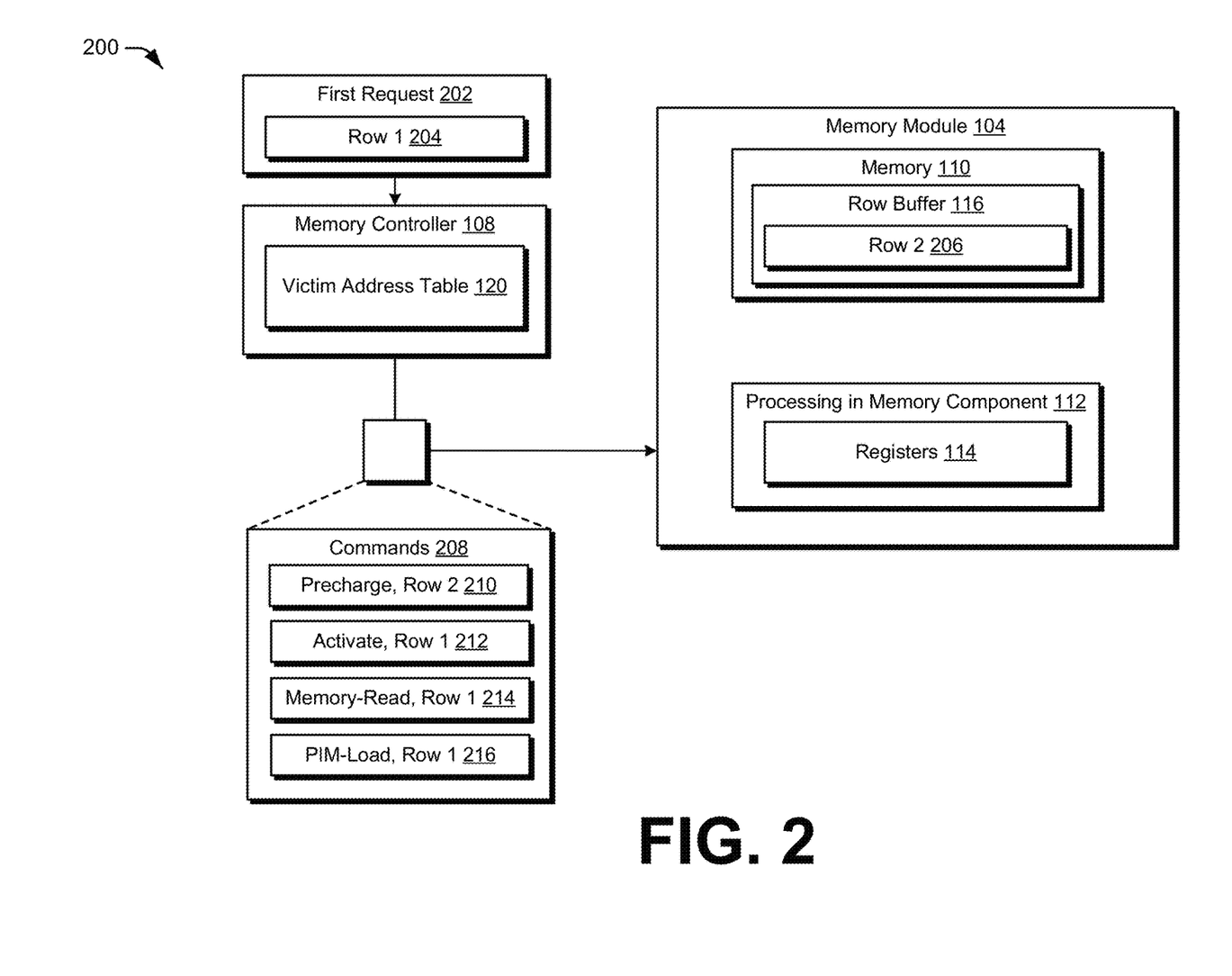
FIG. 2 depicts a non-limiting example in which a memory controller issues a set of commands to access data of a row from the memory and load the data of the row into registers of the processing in memory component.

FIG. 2 depicts a non-limiting example 200 in which a memory controller issues a set of commands to access data of a row from the memory and load the data of the row into registers of the processing in memory component. Example 200 includes the memory module 104 and the memory controller 108. The memory module 104 includes the memory 110 and the PIM component 112. The PIM component 112 includes the registers 114. The memory controller 108 includes the victim address table 120.

As shown, the memory controller 108 receives a first request 202 to access a first row 204 of the memory 110. By way of example, the first request 202 is a load request that instructs the memory controller 108 to read data of the first row 204 for further processing by the core 106. In addition to maintaining the victim address table 120 which identifies the rows that are currently stored in the registers 114, the memory controller 108 also tracks which row is currently open in the row buffer 116. Thus, in response to receiving the first request 202, the memory controller 108 checks for a row hit in the row buffer 116, i.e., the memory controller 108 determines whether the row that is requested to be accessed is open in the row buffer 116. If the memory controller 108 detects a row hit in the row buffer 116, the memory controller 108 accesses the data of the first row 204 from the row buffer 116 without issuing a precharge command or an activate command.

As illustrated in the example 200, however, a second row 206 is currently open in the row buffer 116. Since a row hit was not detected in the row buffer 116, the memory controller 108 checks for a row hit in the registers 114. To do so, the memory controller 108 determines an address associated with the first request 202, which in the example 200 is an address that identifies the first row 204. Further, the memory controller 108 compares the address of the first request 202 to addresses included in the victim address table 120. If a matching address is found, then the memory controller 108 detects a row hit indicating that the data of the requested row is stored in the registers 114. If a matching address is not found, then the memory controller 108 does not detect a row hit indicating that the data of the requested row is not stored in the registers 114.

Based on a row hit detected in the registers 114, the memory controller 108 issues one or more commands to access the data of the first row 204 from the registers 114 of the PIM component 112 without issuing a precharge command or an activate command. However, as shown, the victim address table 120 does not include an address for the first row 204, and as such, a row hit is not detected. Thus, the memory controller 108 issues a set of commands 208 to service the first request 202 including a precharge command 210 to close the second row 206 that is currently open in the row buffer 116, an activate command 212 to open the first row 204, and one or more memory-read commands 214 to read the data of the first row 204 from the row buffer 116 for further processing by the core 106. In addition to the commands 210, 212, 214 that are issued to service the first request 202, the memory controller 108 also issues one or more PIM-load commands to load the data of the first row 204 into the registers 114 of the PIM component 112.

In one or more implementations, the memory controller 108 implements a proactive load policy in which the PIM-load commands 216 are issued in parallel with the commands that access the data of the first row 204 from the row buffer 116. By way of example, the data of the first row 204 is loaded into the registers 114 concurrently while the data of the first row 204 is read from the row buffer 116. Additionally or alternatively, the memory controller 108 implements a reactive load policy in which the PIM-load commands 216 are issued reactively prior to the first row 204 being closed. By way of example, the memory controller 108 receives a subsequent request to access a different row of the memory 110, and in response, the memory controller 108 issues the PIM-load commands 216 followed by a precharge command to close the first row 204.

The proactive load policy enables improved memory access latency over the reactive load policy because the latency for loading the first row 204 into the registers 114 is hidden by the latency for accessing the data of the first row 204 from the row buffer 116, e.g., reading from and/or writing to the row buffer 116. However, additional computer hardware is utilized to implement the proactive load policy. By way of example, the proactive load policy utilizes an additional wired and/or wireless connection that interconnects the memory controller 108, the memory 110, and the PIM component 112. In at least one example, for instance, a first data bus is utilized to transmit the data of the first row 204 to the memory controller 108 and a second data bus is utilized to concurrently transmit the data of the first row 204 to the registers 114. However, not all systems include this additional data bus, and as such, the reactive load policy is implementable without utilizing the additional bus. Therefore, the proactive load policy enables improved memory access latency, while the reactive load policy enables decreased hardware complexity.

Notably, the memory module 104 can include any number of PIM components 112 each having a set of registers 114. In various examples, each PIM component 112 services a single bank of the memory 110, each PIM component 112 services multiple banks of the memory 110, multiple PIM components 112 service a single bank of the memory 110, and/or multiple PIM components 112 service multiple banks of the memory 110. In implementations in which a single PIM component 112 services one or more banks of the memory 110, there may be insufficient storage in the single set of registers 114 to store an entire row of data. In a specific example, for instance, the registers 114 of the PIM component 112 store a maximum of sixteen bits of data, while the rows of the memory 110 include thirty-two bits of data. Given this, the PIM-load commands 216 are effective to store only the first sixteen bits of the first row 204 in the registers 114.

In implementations in which multiple PIM components 112 service multiple banks of the memory 110, there may be sufficient storage in the multiple sets of registers 114 to store multiple rows of data. By way of example, the memory module 104 includes four PIM components that share PIM resources to collectively service four banks of the memory 110. Continuing with the previous example, each set of registers 114 stores a maximum of sixteen bits of data and each row of the memory 110 comprises thirty-two bits of data. Given this, the shared PIM registers 114 of the four PIM components 112 can store a maximum of sixty-four bits of data, and as such, can store two full rows in the shared registers 114. It is to be appreciated that the registers of each PIM component can store any amount of data without departing from the spirit or scope of the described techniques, examples of which include storage sufficient to store a partial row, storage sufficient to store an entire row, storage sufficient to store multiple rows, etc.

In one or more implementations, the memory controller 108 opportunistically determines whether to issue the PIM-load commands 216 based on frequency of access and/or recency of access. By way of example, the memory controller 108 identifies a frequency with which the first row 204 has previously been accessed (e.g., by prior requests). The memory controller 108 further compares the identified frequency to a threshold frequency, which in various examples, is a threshold number of accesses (e.g., the row has been accessed at least five times) or a threshold percentage of accesses, e.g., the row has been accessed by at least 0.5% of requests. In additional examples, the threshold frequency considers a recency of access, e.g., the row has been accessed at least five times in the previous thousand requests. Additionally or alternatively, the threshold represents a subset of rows having a highest access frequency, e.g., the one-thousand rows that are accessed most frequently. If the access frequency of the first row 204 meets or exceeds the threshold frequency, then the memory controller 108 issues the set of commands 208 including the PIM-load commands 216. In contrast, the memory controller 108 issues the set of commands 208 without the PIM-load commands when the access frequency of the first row 204 does not meet or exceed the threshold frequency.

In another example, the memory controller 108 opportunistically determines whether to issue the PIM-load commands 216 based on pending requests. By way of example, the memory controller 108 maintains a pending request queue, which includes requests that have been received by the memory controller 108, but have not yet been serviced. Thus, in response to receiving the first request 202 to access the first row 204, the memory controller 108 inspects the pending request queue to determine whether a subsequent request to access the first row 204 is pending. If a subsequent request to access the first row 204 is included in the pending request queue, the memory controller 108 issues the set of commands 208 including the PIM-load commands 216. In contrast, the memory controller 108 issues the set of commands 208 without the PIM-load commands 216 if a subsequent request to access the first row 204 is not included in the pending request queue. By opportunistically loading rows into the registers 114 based on frequency of access, recency of access, and pending requests, the memory controller 108 stores rows in the registers 114 that are more likely to be accessed by subsequent requests, thereby increasing row hit rate and improving memory access latency.

In accordance with the described techniques, the memory controller 108 is configured to repurpose the registers 114 as victim row buffers in response to determining that the registers 114 are idle, e.g., not servicing PIM commands. In other words, the memory controller 108 is configured to repurpose the registers 114 as victim row buffers in response to the core 106 and the memory controller 108 servicing a non-PIM workload, e.g., including non-PIM commands. Any one of a variety of techniques may be used to track whether a PIM workload or a non-PIM workload is being serviced. In one example technique, the core 106 transmits a start barrier indicating a beginning of a stream of PIM commands (e.g., computations that are offloaded to the PIM component 112) and an end barrier indicating an end to the stream of PIM commands. Given this, if the first request 202 to access the first row 204 is received after the start barrier and before the end barrier, then the memory controller 108 determines that a PIM workload is being serviced, and as such, the registers 114 are actively servicing PIM commands. Based on this determination, the set of commands 208 issued by the memory controller 108 does not include the PIM-load commands 216 since the registers 114 are busy servicing PIM commands. If the first request 202 is not surrounded by a start barrier and an end barrier, however, the memory controller 108 determines that a non-PIM workload is being serviced, and as such, the registers 114 are idle. Thus, the set of commands 208 issued by the memory controller 108 does include the PIM-load commands 216.

As mentioned above, the memory module 104 can include any number of PIM components 112 each having a set of registers 114. Thus, in some implementations, one or more sets of idle registers are repurposed as victim row buffers while active sets of registers service PIM commands. In one example technique to do so, the core 106 communicates hints along with the above-mentioned barriers that identify which PIM components 112 and corresponding registers 114 are used to service a series of PIM commands. Consider an example in which the memory module 104 includes the PIM component 112 that services a first bank and includes the set of registers 114, and an additional PIM component that services a second bank and includes an additional set of registers. In this example, the start barrier for a series of PIM commands includes one or more hints indicating that the additional registers of the additional PIM component are used by the series of PIM commands but the registers 114 of the PIM component 112 are not used by the series of PIM commands. Moreover, the first request 202 is received after the start barrier and before the end barrier in this example, indicating that at least some of the PIM components of the memory module 104 and corresponding sets of registers are actively servicing PIM commands. Despite this, the memory controller 108 issues the set of commands 208 including the PIM-load commands 216 since the registers 114 of the PIM component 112 are not servicing the series of PIM commands. However, if a subsequent request is received to access a different row of the second bank, then the memory controller 108 issues a set of commands that do not include PIM-load commands since the additional registers of the additional PIM component are busy servicing the series of PIM commands.

Figure 3:
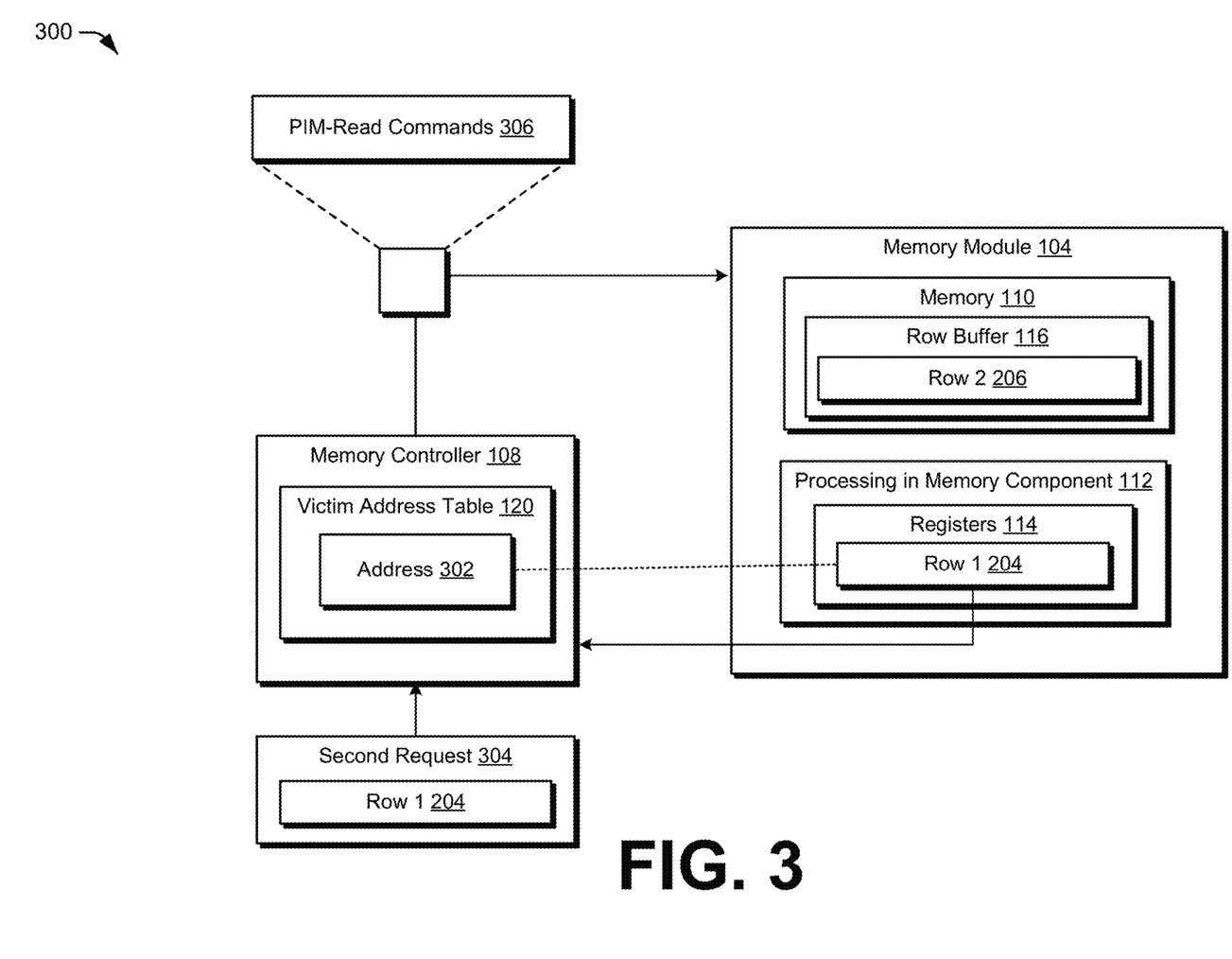
FIG. 3 depicts a non-limiting example in which a memory controller issues a set of commands to access the data of the row from the registers of the processing in memory component.

FIG. 3 depicts a non-limiting example 300 in which a memory controller issues a set of commands to access the data of the row from the registers of the processing in memory component. Example 300 includes the memory module 104 and the memory controller 108. The memory module 104 includes the memory 110 and the PIM component 112. The PIM component 112 includes the registers 114. The memory controller 108 includes the victim address table 120. As shown, the data of the first row 204 is stored in the registers 114 as a result of the PIM-load commands 216. Further, in response to issuing the PIM-load commands 216, the memory controller 108 has updated the victim address table 120 to include an address 302 for the first row 204 that was loaded into the registers 114.

As discussed above, one or more PIM components 112 service multiple banks of the memory 110 in some scenarios. In these scenarios, the address 302 for the first row 204 includes one or more additional bits to identify the bank to which the first row 204 belongs. Consider an example in which the PIM component 112 is one of multiple PIM components that share PIM registers 114 and collectively service multiple banks of the memory 110. In this example, the first row 204 belongs to a first bank of the multiple banks. In response to issuing the PIM-load commands 216, the memory controller 108 updates the victim address table 120 to include the address 302 that identifies the first row 204 as well as a bank identification that identifies the first bank. In this way, if a subsequent request is to the first row of a different bank of the multiple banks, the memory controller 108 will not register a row hit and mistakenly access the first row of the first bank from the registers 114. In other scenarios, each PIM component 112 services a single bank of the memory 110, and as such, the registers 114 may only have sufficient storage to store a partial row. In these scenarios, the address 302 for the first row 204 identifies only a portion of the first row 204.

In implementations in which the registers 114 of the PIM component 112 (or multiple shared sets of registers of multiple PIM components) have sufficient storage to store multiple rows of the memory 110, the memory controller 108 additionally updates the victim address table 120 to include a register identification. For example, the registers 114 include four registers that are each associated with a register identification, e.g., a first register of the four registers is associated with a register ID of "01." In this example, each of the four registers is configured to store data from one row of the memory 110, and the PIM-load commands 216 cause the data of the first row 204 to be stored in a first register of the four registers. Accordingly, in response to issuing the PIM-load commands 216, the memory controller 108 updates the victim address table 120 to include the address 302 that identifies the first row 204 as well as a register identification that identifies the first register. In this way, if a subsequent request is to the first row 204, the memory controller 108 accesses the data from the first register that maintains the data of the first row 204, and not from one of the other registers (e.g., the second, third, or fourth registers) that do not maintain the data of the first row 204.

In accordance with the described techniques, the memory controller 108 receives a second request 304 to access the first row 204 of the memory 110 at a time subsequent to servicing the first request 202. In the illustrated example 200, for instance, the second request 304 is a load request that instructs the memory controller 108 to read data of the first row 204 for further processing by the core 106. In response to receiving the second request 304, the memory controller 108 checks for a row hit in the row buffer 116. As shown, however, the second row 206 is currently open in the row buffer 116, and as such, a row hit is not detected.

Since a row hit was not detected in the row buffer 116, the memory controller 108 checks for a row hit in the registers 114. To do so, the memory controller 108 determines an address associated with the second request 304, which in the example 300 is an address that identifies the first row 204. Further, the memory controller 108 compares the address of the first request to addresses included in the victim address table 120. Since the address of the second request 304 and the address 302 in the victim address table 120 both identify the first row 204, the memory controller 108 detects a row hit indicating that the data of the first row 204 is stored in the registers 114.

Accordingly, the memory controller 108 issues one or more PIM-read commands 306 to read the data of the first row 204 from the registers 114 of the PIM component 112. In scenarios in which the registers 114 store multiple rows of the memory 110, the PIM-read commands 306 are issued to read the data of the first row 204 from a particular register identified by the register identification in the victim address table 120. By accessing the data of the row from the registers 114, rather than the row buffer 116, the described techniques enable the memory controller 108 to service the second request 304 without issuing a precharge command or an activate command. This is true despite a different row being open in the row buffer 116 at the time the second request 304 is being serviced. Given this, the described techniques eliminate row precharge overhead and row activate overhead that would otherwise be incurred by conventional techniques to service the second request.

Consider an example in which there is insufficient storage in the registers 114 to store the entire first row 204 of data, and as such, the PIM-load commands 216 are effective to store a first portion of the first row 204 in the registers 114. In this example, the second request 304 is to read the entire first row 204, e.g., the second request 304 is to read the first portion of the first row 204 that is maintained in the registers 114 and a second portion of the first row 204 that is not maintained in the registers 114. Thus, in order to service the second request 304, the memory controller 108 issues a series of PIM-read commands 306 to read the first portion of the first row 204 from the registers 114, a precharge command to close the second row 206 that is currently open in the row buffer 116, an activate command to open the first row 204, and a series of memory-read commands to read the second portion of the first row 204 from the row buffer 116. However, the row buffer 116 is not actively servicing commands while the memory controller 108 reads data from the registers 114. Accordingly, rather than waiting until the PIM-read commands 306 are executed, the memory controller 108 takes advantage of the idle row buffer 116 and issues an early precharge command to close the second row 206 and an early activate command to open the first row 204 in parallel with the series of PIM-read commands 306.

In some scenarios, early precharge commands and early activate commands are issued to a different row than the row that is being accessed from the registers 114. Consider another example in which a third request to access a third row of the memory 110 is received and maintained in a pending request queue. In this example, the memory controller 108 inspects the pending request queue to determine that the next request is to a row that is neither open in the row buffer 116 nor stored in the registers 114. Rather than waiting until the PIM-read commands 306 are complete, the memory controller 108 issues an early precharge command to close the second row 206 and an early activate command to open the third row in parallel with the PIM-read commands 306. By issuing the early precharge commands and the early activate commands in parallel with the PIM-read commands 306, the memory controller 108 avoids issuing the precharge command and the activate command on the critical path, and instead hides the row precharge overhead and the row activate overhead with the time it takes to execute the PIM-read commands 306.

In one or more implementations, the memory controller 108 receives a series of PIM commands from the core 106 while implementing techniques described herein to repurpose the registers 114 of the PIM component 112 as victim row buffers. For example, the memory controller 108 receives a start barrier indicating that the registers 114 are used by an upcoming series of PIM commands while the first row 204 is stored in the registers 114. Given this, the memory controller 108 is configured to wipe the data of the first row 204 from the registers 114 so that the registers 114 can be used to service the upcoming series of PIM commands. To do so, the memory controller 108 initially inspects the victim address table 120 to determine whether the data of the first row 204 has been modified since being loaded into the registers 114. By way of example, the address 302 identifying the first row 204 also includes a modification bit which is set by the memory controller 108 in response to the first row 204 being modified in the registers 114, e.g., via a PIM-write command. If the modification bit is set, the memory controller 108 issues one or more PIM-store commands to write the modified data back to the first row 204 in the memory 110 before wiping the registers 114. If, however, the modification bit is not set, then the memory controller 108 wipes the registers 114 without issuing additional PIM-store commands since the data of the first row 204 in the memory 110 is the same as the data of the first row 204 in the registers 114.

In one or more implementations, the registers 114 have sufficient storage to store multiple rows of data and are already full when the memory controller 108 issues the PIM-load commands 216. In these implementations, the memory controller 108 determines which one of multiple rows to remove from the registers 114 in order to make room for the newly loaded row based on frequency of access, recency of access, and/or pending requests, as previously discussed. In one example, for instance, the memory controller 108 determines to remove the most infrequently accessed row from the registers 114. Additionally or alternatively, the memory controller 108 determines to remove the least recently accessed row from the registers 114. Additionally or alternatively, the memory controller 108 determines to remove a row from the registers 114 based on a subsequent request to access the row not being included in the pending request queue. Thus, in addition to updating the victim address table 120 to include an address 302 of a row that was loaded into the registers 114, the memory controller 108 also removes from the victim address table 120 an address of a row that was removed from the registers 114.

Figure 4A:
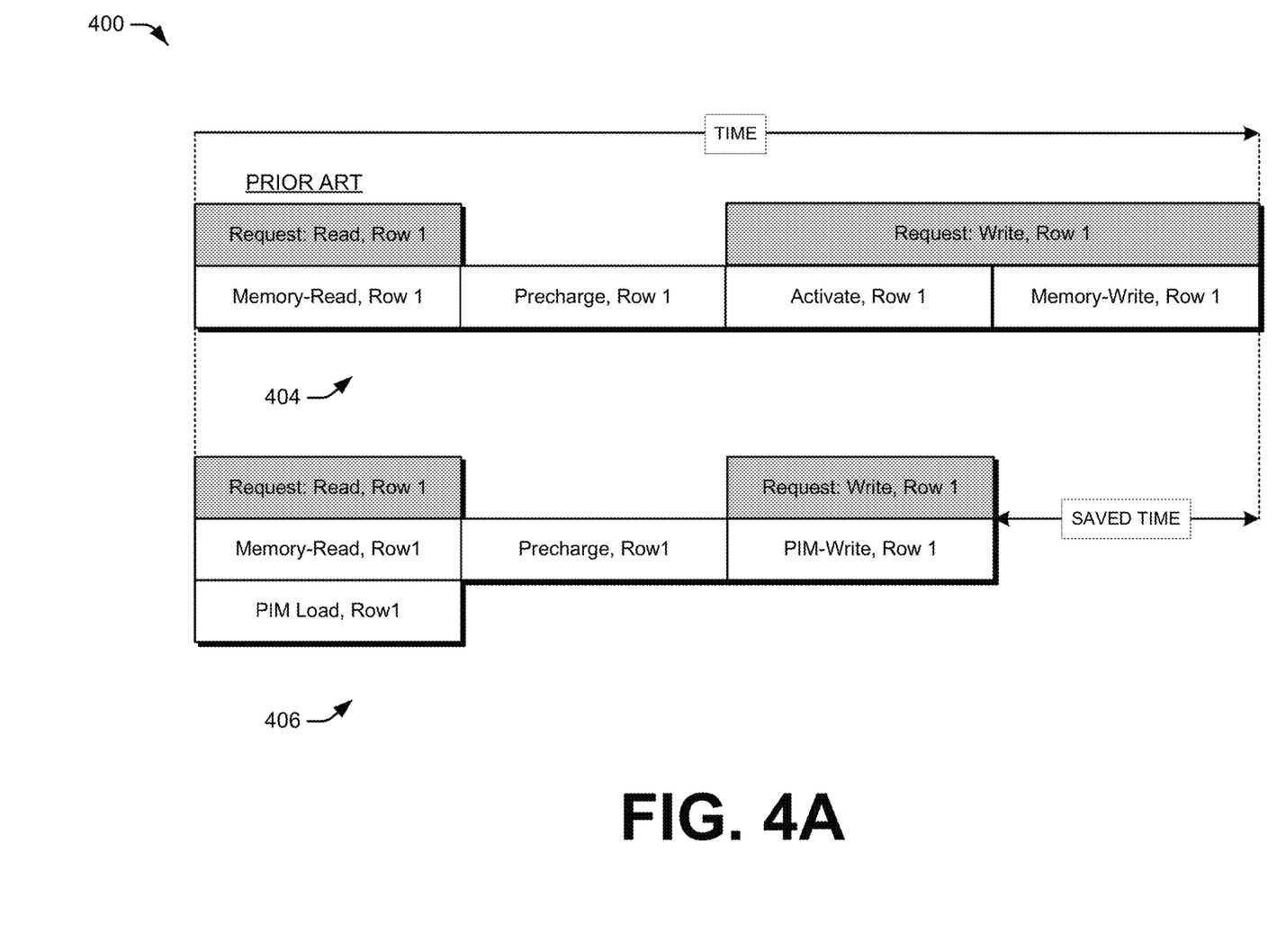
FIGS. 4A and 4B depict non-limiting examples showing an improvement in memory access latency of the described techniques over conventional techniques.
Figure 4B:
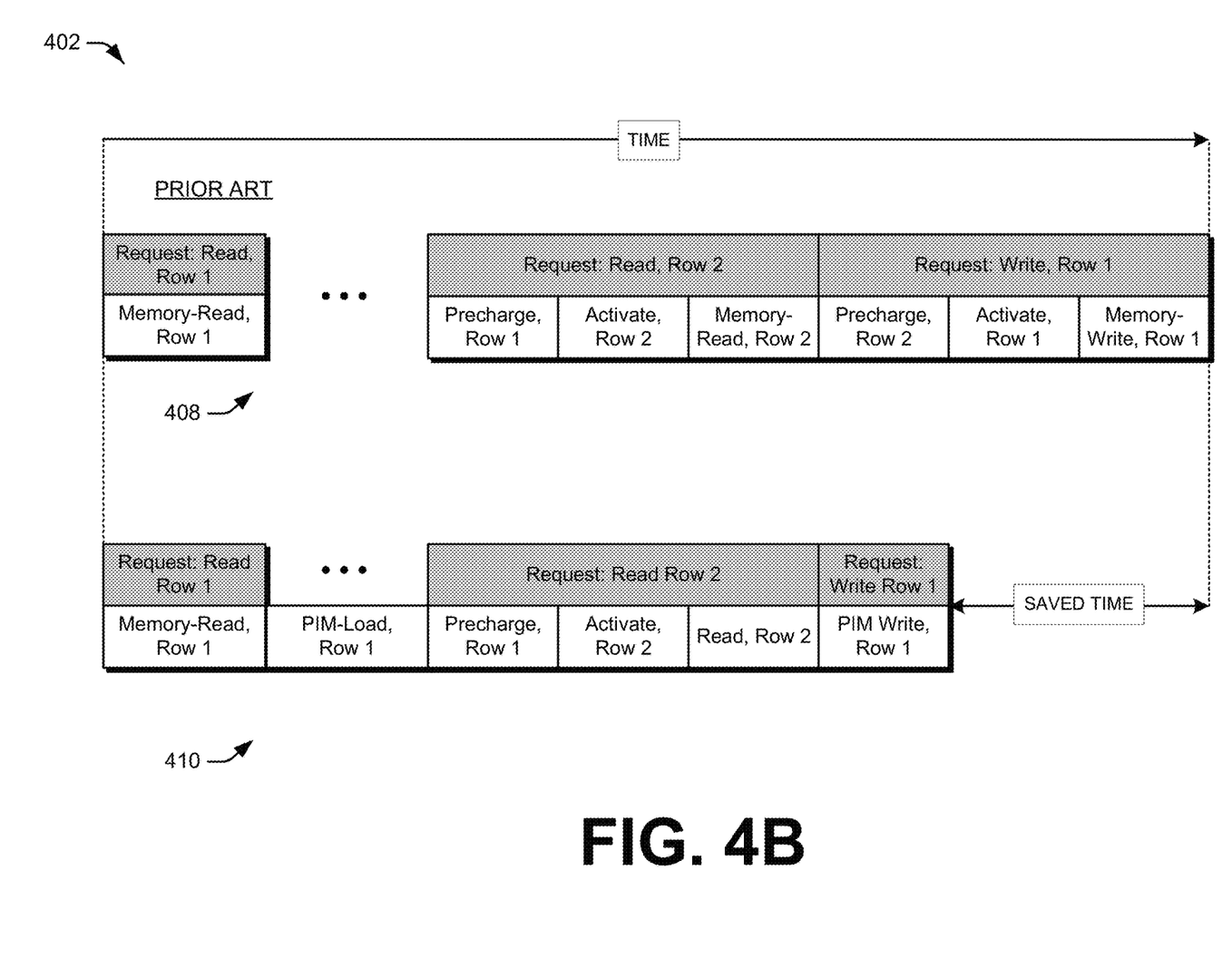

FIGS. 4A and 4B depict non-limiting examples 400, 402 showing an improvement in memory access latency of the described techniques over conventional techniques. In particular, FIG. 4A depicts a prior art example 404 in which a conventional close row policy is implemented to service a first request to read data of a first row and a second request to write data to the first row. As shown, one or more memory-read commands are issued to read the data of the first row from the row buffer. After servicing the first request, a precharge command is automatically issued in accordance with the close row policy. However, the second request is also to the first row, and as a result, an extra activate command is issued to re-open the first row. To finish servicing the second request, one or more memory-write commands are issued to write data to the row buffer.

FIG. 4A further depicts an example 406 in which the techniques described herein are implemented in accordance with a close row policy to service a first request to read data of a first row and a second request to write data to the first row. In addition to issuing the one or more memory-read commands to read the data of the first row from the row buffer 116, the memory controller 108 also issues one or more PIM-load commands to load the data of the first row into the registers 114. As shown, the memory controller 108 implements the proactive load policy to load the first row into the registers 114 and read the first row from the row buffer 116 in parallel. After servicing the first request, a precharge command is automatically issued in accordance with the close row policy. To service the second request, the memory controller 108 issues one or more PIM-write commands to write data to the first row stored in the registers 114. By doing so, the memory controller 108 is able to service the second request without issuing the extra activate command to re-open the first row. As a result, the described techniques improve memory access latency over the conventional close row policy by eliminating row activate overhead, thereby enabling the second request to be serviced in a shorter amount of time.

FIG. 4B depicts a prior art example 408 in which a conventional open row policy is implemented to service a first request to read data of a first row, a second request to read data of a second row, and a third request to write data to the first row. As shown, one or more memory-read commands are issued to read data of the first row from the row buffer. To service the second request, the memory controller issues a precharge command to close the first row, an activate command to open the second row, and one or more memory-read commands to read data of the second row from the row buffer. To service the third request, the memory controller again issues a precharge command to close the second row, an activate command to re-open the first row, and one or more memory-write commands to write data to the row buffer.

FIG. 4B further depicts an example 410 in which the techniques described herein are implemented in accordance with an open row policy to service a first request to read data of a first row, a second request to read data of a second row, and a third request to write data to the first row. In addition to issuing the one or more memory-read commands to read the data of the first row from the row buffer 116, the memory controller 108 also issues one or more PIM-load commands to load the data of the first row into the registers 114. As shown, the memory controller 108 implements the reactive load policy to load the data of the first row into the registers 114 prior to the first row being closed. To service the third request, the memory controller 108 issues one or more PIM-write commands to write data to the first row stored in the registers 114. By doing so, the memory controller 108 is able to service the third request without issuing the precharge command to close the second row and without issuing the activate command to re-open the first row. As a result, the described techniques improve memory access latency over the conventional open row policy by eliminating row precharge overhead and row activate overhead, thereby enabling the third request to be serviced in a shorter amount of time.

Figure 5:
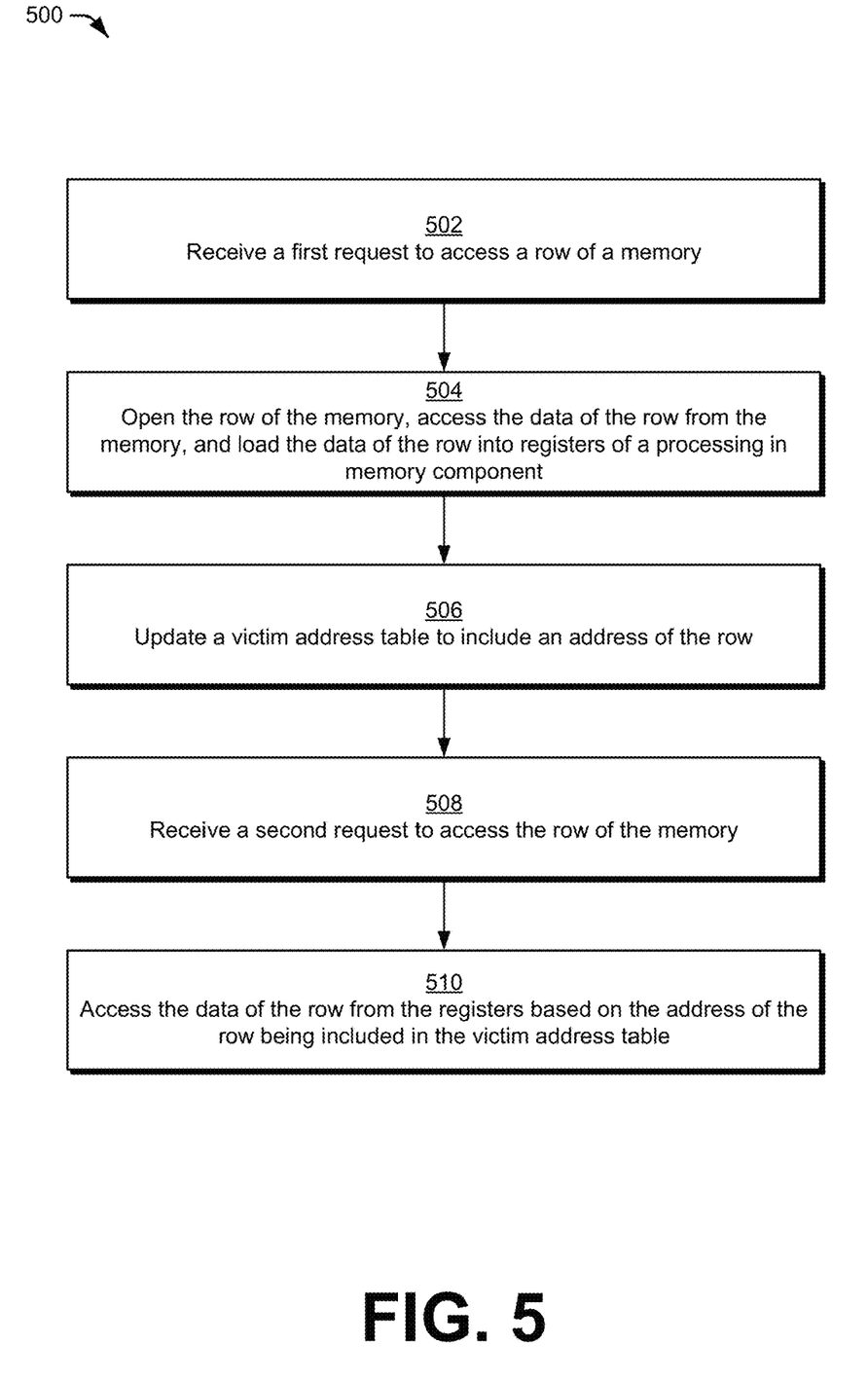
FIG. 5 depicts a procedure in an example implementation of leveraging processing in memory registers as victim buffers in accordance with the described techniques.

FIG. 5 depicts a procedure 500 in an example implementation of leveraging processing in memory registers as victim buffers in accordance with the described techniques.

A first request to access a row of a memory is received (block 502). By way of example, the memory controller 108 receives the first request 202 to access data of the first row 204.

The row of the memory is opened, the data of the row is accessed from the memory, and the data of the row is loaded into registers of a processing in memory component (block 504). By way of example, in response to receiving the first request 202, the memory controller 108 issues the first set of commands 208, including the activate command 212 to open the first row 204, one or more commands that access the data of the row from the memory 110 (e.g., memory-read commands and/or memory-write commands), and the one or more PIM-load commands 216 to load the data of the first row 204 into the registers 114 of the PIM component 112. If a different row is open in the row buffer 116 when the first request 202 is received, then the memory controller 108 additionally issues a precharge command to close the different row.

A victim address table is updated to include an address of the row (block 506). By way of example, in response to issuing the PIM-load commands, the memory controller 108 adds the address 302 of the first row 204 to the victim address table 120.

A second request to access the row of the memory is received (block 508). By way of example, the memory controller 108 receives the second request 304 to access data of the first row 204.

The data of the row is accessed from the registers based on the address of the row being included in the victim address table (block 510). In response to receiving the second request 304 to access the first row 204, for instance, the memory controller 108 inspects the victim address table 120 to determine that the address 302 of the first row 204 is included in the victim address table 120. Accordingly, the memory controller 108 issues one or more commands that access the data of the first row 204 from the registers 114 (e.g., PIM-read commands and/or PIM-write commands), rather than the row buffer 116.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing unit 102, the memory module 104, the core 106, the memory controller 108, the memory 110, and the PIM component 112) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
a memory;
a processing in memory circuit having registers for data storage; and
a memory controller having a victim address table configured to include at least one address of at least one row of the memory that is stored in the registers, the memory controller configured to:
receive a request to access a row of the memory; and
access data of the row from the registers based on an address of the row being included in the victim address table.

2. The computing device of claim 1, wherein an additional row of the memory is open when the request is received, the additional row remaining open after the data of the row is accessed from the registers.

3. The computing device of claim 1, wherein the memory controller is configured to:
receive a prior request to access the row of the memory before the address of the row is stored in the victim address table; and
responsive to the prior request being received:
open the row of the memory;
access the data of the row from the memory;
load the data of the row into the registers; and
update the victim address table to include the address of the row.

4. The computing device of claim 3, wherein the memory controller is configured to load the data of the row into the registers and access the data of the row from the memory in parallel.

5. The computing device of claim 3, wherein the memory controller is configured to load the data of the row into the registers after the data is accessed from the memory.

6. The computing device of claim 3, wherein the data of the row that is loaded into the registers corresponds to a first portion of the data of the row, and the request is to access the first portion of the data of the row and a second portion of the data of the row.

7. The computing device of claim 6, wherein the memory controller is configured to automatically close the row after the data of the row is accessed from the memory.

8. The computing device of claim 7, wherein the memory controller is configured to, in response to the request being received, re-open the row of the memory and access the first portion of the data of the row from the registers in parallel.

9. The computing device of claim 3, wherein the memory controller is configured to load the data of the row into the registers based on a non-processing in memory workload being serviced.

10. The computing device of claim 3, wherein the memory controller is configured to load the data of the row into the registers based on an access frequency of the row exceeding a threshold frequency.

11. The computing device of claim 3, wherein the memory controller is configured to load the data of the row into the registers based on the request being included in a pending request queue.

12. The computing device of claim 3, wherein the memory controller is configured to update the victim address table to include an indication of a particular register into which the data of the row is loaded, the row being accessed from the particular register in response to the request being received.

13. A method comprising:
receiving, by a memory controller, a request to access a row of a memory;
loading, by the memory controller, data of the row into registers of a processing in memory circuit;
updating, by the memory controller, a victim address table to include an address of the row;
receiving, by the memory controller, a subsequent request to access the row of the memory; and in response to receiving the subsequent request, accessing, by the memory controller, the data of the row from the registers.

14. The method of claim 13, wherein the data of the row is accessed from the registers based on the address of the row being included in the victim address table.

15. The method of claim 13, further comprising, in response to receiving the request:
opening, by the memory controller, the row of the memory; and
accessing, by the memory controller, the data of the row from the memory.

16. The method of claim 15, further comprising automatically closing, by the memory controller, the row of the memory after the data of the row is accessed from the memory, the row remaining closed after the data of the row is accessed from the registers.

17. The method of claim 15, wherein the accessing the data of the row from the memory and the loading the data of the row into the registers are performed in parallel.

18. The method of claim 15, wherein the loading the data of the row into the registers is performed after the accessing the data of the row from the memory.

19. An apparatus comprising:
a memory;
a processing in memory circuit having registers for data storage;
a memory controller having a victim address table configured to include at least one address of at least one row of the memory that is stored in the registers; and
a core to transmit requests to the memory controller, the requests causing the memory controller to:
responsive to a first request to access a row of the memory:
open the row;
access data of the row from the memory;
load the data of the row into the registers; and
update the victim address table to include an address of the row; and
responsive to a second request to access the row, access the data of the row from the registers based on the address of the row being included in the victim address table.

20. The apparatus of claim 19, wherein the first request causes the memory controller to load the data of the row into the registers based on a non-processing in memory workload being serviced.

* * * * *